United States Patent [19]

Anthony et al.

[11] 4,135,972
[45] Jan. 23, 1979

[54] NUCLEAR REACTOR SPACER ASSEMBLY

[75] Inventors: Andrew J. Anthony, Tariffville; Malcolm D. Groves, Suffield, both of Conn.

[73] Assignee: Combustion Engineering, Inc., Windsor, Conn.

[21] Appl. No.: 671,596

[22] Filed: Mar. 29, 1976

[51] Int. Cl.² ............................................. G21C 3/30
[52] U.S. Cl. ........................................ 176/78; 176/76
[58] Field of Search ................................... 176/76, 78

[56] References Cited

U.S. PATENT DOCUMENTS

| | | | |
|---|---|---|---|
| 3,791,466 | 2/1974 | Patterson | 176/76 |
| 3,819,477 | 6/1974 | Fromel | 176/78 |
| 3,920,516 | 11/1975 | Kmonk | 176/78 |

FOREIGN PATENT DOCUMENTS 1204657  9/1970  United Kingdom ..................... 176/78

*Primary Examiner*—Samuel W. Engle
*Assistant Examiner*—Donald P. Walsh

[57] ABSTRACT

A fuel assembly for a nuclear reactor wherein the fuel element receiving and supporting grid is comprised of a first metal, the guide tubes which pass through the grid assembly are comprised of a second metal and the grid is supported on the guide tubes by means of expanded sleeves located intermediate the grid and guide tubes. The fuel assembly is fabricated by inserting the sleeves, of initial outer diameter commensurate with the guide tube outer diameters, through the holes in the grid assembly provided for the guide tubes and thereafter expanding the sleeves radially outwardly along their entire length such that the guide tubes can subsequently be passed through the sleeves. The step of radial expansion, as a result of windows provided in the sleeves having dimensions commensurate with the geometry of the grid, mechanically captures the grid and simultaneously preloads the sleeve against the grid whereby relative motion between the grid and guide tube will be precluded.

5 Claims, 5 Drawing Figures

U.S. Patent     Jan. 23, 1979     4,135,972
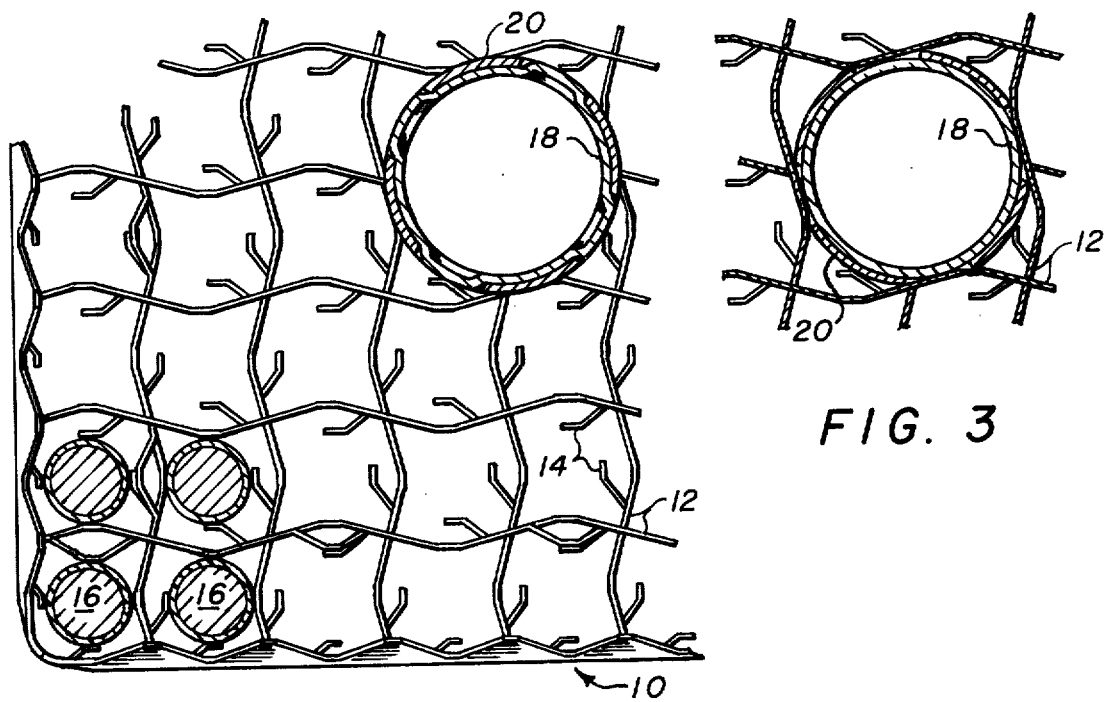
FIG. 1
FIG. 3
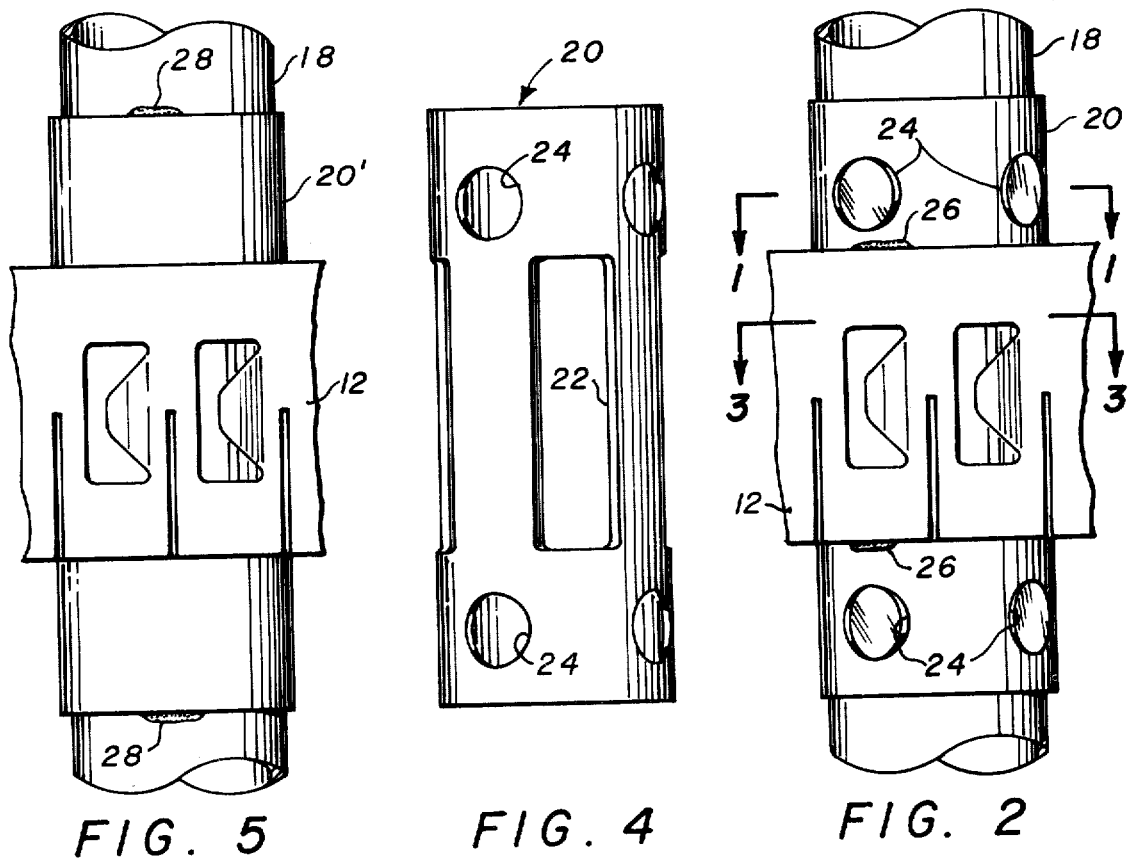
FIG. 5     FIG. 4     FIG. 2

NUCLEAR REACTOR SPACER ASSEMBLY

BACKGROUND OF THE INVENTION (1) Field of the Invention

The present invention relates to the supporting of fuel elements within a nuclear reactor and particularly to the attachment of web members comprised of a first metal to guide tubes comprised of a second metal to define a fuel element supporting spacer grid. More specifically, the present invention relates to high strength nuclear reactor fuel assemblies characterized by the use of different metals to define the fuel element receiving grids and the guide tubes on which the grids are supported and in which neutron absorber elements move for control purposes. Accordingly, the general objects of the present invention are to provide novel and improved methods and apparatus of such character.

(2) Description of the Prior Art

The functions performed by and the considerations which enter into the design of spacer grids for nuclear reactor fuel assemblies are discussed in detail in U.S. Pat. Nos. 3,607,640 and 3,664,924 issued to Donald M. Krawiec and assigned to the assignee of the present invention. Prior art spacer grids have, in many cases, been fabricated substantially entirely of a zirconium alloy; i.e., zircaloy. The use of annealed zircaloy has been dictated by its desirable combination of mechanical strength, workability and low neutron capture cross-section. Some designers, however, have favored fuel assemblies wherein the guide tubes are comprised of a first metal, for example zircaloy, while the grid defining members are fabricated from a second metal; the second metal typically having a higher neutron capture cross-section when compared to zircaloy but also having a greater stiffness than annealed zircaloy. Typical of the materials employed in spacer grids and having a greater stiffness than zircaloy is the steel alloy known as Inconel.

A fuel assembly for a nuclear reactor will, in most instances, comprise a plurality of guide tubes which extend between upper and lower support plates; the support plates maintaining the requisite parallelism of the guide tubes. Intermediate the support plates, and mounted on the guide tubes, will be a plurality of grids each of which define an "egg crate" type structure. The fuel elements, which typically will comprise zircaloy tubes containing pellets of enriched uranium, are frictionally engaged in the spacer grids and are held in position thereby in parallelism to the guide tubes. As noted above, it is often considered desirable to employ a material such as Inconel to define the spacer grids while utilizing zircaloy guide tubes. Inconel, however, cannot reliably be welded to zircaloy and thus the use of dissimilar materials for the spacer grid and guide tubes precipitates a problem in the mounting of the spacer grids on the guide tubes.

There have, in the prior art, been a number of techniques proposed for the joining of spacer grids comprised of a first metal to guide tubes comprised of a second dissimilar metal. These prior art techniques generally provide for a friction fit and/or mechanical stops between the grids and tubes and have proved to be a less than satisfactory solution since the inherently present clearances between parts have made possible vibration induced movement of the spacer grids relative to the guide tubes with the inherent possibility of fretting the fuel element cladding incident to any such vibration. Restated, the prior art joining techniques have provided only for mechanical capture of the grids on the tubes and have not guaranteed tightness between the parts as is required to insure against relative axial, radial and azimuthal motion. U.S. Pat. No. 3,920,516 discloses a prior art mechanical capture technique for use in mounting Inconel grids on zircaloy guide tubes.

SUMMARY OF THE INVENTION

The present invention overcomes the above briefly discussed deficiencies and disadvantages of the prior art by providing a novel and improved technique for the interconnection of components formed of dissimilar metals and particularly for the attachment of web members comprised of a first metal to tubes comprised of a second metal. The present invention also encompasses an improved nuclear reactor fuel assembly utilizing non-zircaloy spacer grids and zircaloy control element receiving guide tubes.

In accordance with the invention web-like spacer grid defining members of a first metal are mechanically coupled to a guide tube comprised of a second metal by means of a cylindrical sleeve comprised of the same metal as the spacer grid defining web members. The cylindrical sleeve is continuous at its upper and lower ends and has an axial length greater than the width of the spacer grid. The cylindrical sleeve initially has, along at least a portion of its length extending from a first end along an axial distance greater than the width of the spacer grid, an outer diameter commensurate with the outer diameter of the guide tubes. The sleeve is provided with a plurality of cutouts or windows, typically four, having a length substantially equal to the width of the spacer grid web members; these windows being centered about the midpoint of the length of the sleeve. The width of these windows in the sleeve is selected so as to insure, when the sleeve is installed, contact between the side edges of each window and a grid web member whereby relative radial and azimuthal motion between the grid and tube is precluded. In accordance with a first embodiment of the invention, the sleeve is also provided with a plurality of apertures, spaced about the circumference of the sleeve, adjacent the oppositely disposed ends thereof.

In use of the first embodiment of the invention, the sleeve is inserted in the spacer grid with the windows in registration with those portions of the spacer grid web members which would normally contact the guide tube. The sleeve is then expanded radially outwardly, for example by swaging, so as to have along its entire length an inner diameter slightly larger than the outer diameter of the guide tube. The outward expansion of the sleeve results in a guaranteed tight fit between the spacer grid web members and all four edges of each window intercepted thereby. This tight fit, in turn, produces a definite mechanically locking of the sleeves to the grid and, when the sleeves are attached to the guide tubes, prevents any axial, radial or azimuthal motion between the grids and guide tubes. Since the spacer grid web members and the sleeve are of the same material in the first embodiment, the interconnection of the sleeves and web members can be enhanced by welding these components to one another. The retention of the spacer grid at the proper point along the guide tube is accomplished by subsequently inserting the guide tube through the sleeve and thereafter expanding the guide tube radially outwardly in the areas where the apertures have been formed in the sleeve to lock the guide tube to the sleeve both above and below the spacer grid.

In accordance with a second embodiment of the invention, the sleeve is comprised of the same material as the guide tubes; i.e., zircaloy; and thus the sleeve may be welded to the guide tube subsequent to the expansion of the sleeve which permits passage of the guide tube therethrough. In view of the attachment of the sleeve to the guide tube by welding, the sleeve need not be provided with the apertures of the first embodiment and no expansion of the guide tube is required. In the second embodiment, as in the first embodiment, the sleeve is provided with windows located intermediate the length of the sleeve; these windows having a length commensurate with the grid width and a width appropriate to achieve anti-rotation. As a result of the expansion of the sleeve, the top and bottom edges of the windows extend outwardly over the grid web members thus locking the spacer grid in place axially and the loading of the side edges of the windows in the expanded sleeve against the grid web members prevents radial and azimuthal relative motion between the guide tubes and grids.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 is a partial cross-sectional top plan view of a fuel assembly incorporating a first embodiment of the present invention;

FIG. 2 is a partial side elevation view of the fuel assembly of FIG. 1 depicting the attachment of the spacer grid to a guide tube in accordance with a first embodiment of the invention;

FIG. 3 is a cross-sectional top view, taken along line 3—3 of FIG. 2, of the first embodiment of the invention;

FIG. 4 is a side elevation view of an expandable sleeve employed in the practice of the first embodiment of the invention; and FIG. 5 is a view similar to FIG. 2 depicting a second embodiment of the present invention.

DESCRIPTION OF THE PREFERRED EMBODIMENTS

With reference now to FIG. 1, a spacer grid for a nuclear reactor fuel assembly is indicated generally at 10. Spacer grid 10 is defined by a plurality of intersecting web-like members such as indicated at 12. The configuration of web members 12, which are provided with integral springs such as indicated at 14, may be clearly seen from a joint consideration of FIGS. 1 and 2. The web members 12 define an "egg crate" structure through which the fuel rods or elements, such as those fuel elements indicated at 16, pass. It will be understood that, in a single fuel assembly, there will be a plurality of spatially separated spacer grids which locate and support the fuel elements.

The spacer grids of a fuel assembly are mounted on the exterior of guide tubes. Absorber or moderator elements, also known as control rods, which are movable into and out of the fuel assembly to control fission rate, are positioned within the guide tubes. In a typical fuel assembly there will be five guide tubes extending the length of the fuel assembly between upper and lower support plates. In FIG. 1 only a single guide tube 18 has been shown in cross-section. Guide tube 18 will customarily be comprised of zircaloy while the spacer grid defining members 12 may be comprised of Inconel. Inconel can not reliably be joined to zircaloy by conventional fusion bonding techniques, such as welding, or by brazing.

In accordance with the present invention the spacer grids are mechanically connected to the guide tubes through a cylindrical intermediary sleeve. The configuration of such a sleeve as employed in a first embodiment of the present invention may be clearly seen from FIG. 4; the sleeve 20 of FIG. 4 also being visible in FIGS. 1, 2 and 3. In accordance with the first embodiment of the invention, the sleeve 20 is comprised of the same material as the web members 12; i.e., sleeve 20 will be Inconel in the example to be first described. Continuing to refer to FIG. 4, it may be seen that sleeve 20 is continuous at its oppositely disposed ends. Sleeve 20 is provided, intermediate its length, with cutouts or windows 22 of generally rectangular shape. Additionally, in the regions between the upper and lower terminations of the windows 22 and its opposite ends, sleeve 20 is provided with circumferentially offset apertures of holes 24. For reasons which will become apparent from the discussion below, the outer diameter of sleeve 20 is initially commensurate with the outer diameter of the guide tube 18.

It should be observed that design factors, which will not be discussed herein, dictate the size of the guide tube 18 and the dimensions of the opening in the spacer grid through which the guide tube passes. Accordingly, it is not possible to simply insert a sleeve having an inner diameter which exceeds the outer diameter of the guide tube into the opening in the spacer grid since insufficient clearance exists for such a sleeve. Similarly, design factors preclude the reduction, either wholly or at portions along its length, of the inner diameter of the guide tube. Restated, using a smaller guide tube would affect the control rod worth while employing a larger opening in the spacer grid would require complete grid and possibly complete fuel assembly redesign.

In accordance with the present invention the sleeve 20 is inserted in the opening in the spacer grid with the windows 22 located in those regions where the guide tube will contact the web members 12. Thereafter, the sleeve 20 is radially expanded by swaging, typically in a two step process, using mandrels of different diameter. During the radial expansion step the portions of the sleeve between the windows 22 will be expanded outwardly into the corners of the spacer grid guide tube opening where clearance exists. The continuous upper and lower portions of the sleeve; i.e., those portions which have the holes 24 formed therein; are freely expandable since these portions are located above and below the spacer grid. As these continuous upper and lower portions of the sleeve are expanded outwardly the upper and lower edges of the windows 22 will pass outwardly over the web members 12 thus mechanically capturing the web members in the axial direction. At the same time, the loading of the side edges of the windows against the grid web members will prevent relative radial and azimuthal motion and will aid in preventing relative axial motion. Since the web members 12 and sleeve 20 of the embodiment of FIGS. 1-4 are comprised of the same material, immobilization of the sleeve in the grid may be enhanced by spot welds 26 as indicated in FIG. 2. The results of the expansion of sleeve 20 may be best seen from joint consideration of FIGS. 1 and 3 which respectively are cross-sectional views taken through an expanded sleeve above the spacer grid and intermediate the width of the spacer grid.

After the sleeves have been installed in the spacer grids, the fabrication of the fuel assembly is continued by passing the guide tubes 18 through the expanded sleeves 20 as shown in FIGS. 1-3. When the spacer grids are properly positioned along the length of the guide tubes the guide tubes are expanded, using a mandrel, only in those regions which are in alignment with the holes 24 in the sleeve 20. Expansion of the wall of guide tube 18 into the holes 24 in sleeve 20 results, as may be clearly seen from FIG. 1, in the mechanical locking of the sleeve to the guide tube both above and below the spacer grid. This manner of locking, in combination with the capture and welding of the spacer grid web members to the sleeve provides a fuel assembly wherein vibratory movement of the spacer grid relative to the guide tube can not occur.

In the embodiment of FIG. 5 the sleeve 20' is comprised of the same material as the guide tube 18. Accordingly, in the embodiment of FIG. 5 a fusion bond can not be established between the spacer grid web members 12 and sleeve 20'. Sleeve 20' of the FIG. 5 embodiment is provided with windows, identical in size, shape and position to windows 22 of the sleeve of FIG. 4. Sleeve 20' is not provided with the apertures 24 in the continuous portions thereof located above and below the windows.

In the assembly of a spacer grid in accordance with the FIG. 5 embodiment the sleeve 20' will be inserted in the guide tube opening in the spacer grid in the same manner as discussed above. Thereafter, the sleeve is expanded along its entire length thereby resulting in the mechanical capture of the web members 12 in the windows 22. As noted above, the swaging operation which results in the expansion of sleeve 20' effectively preloads the sleeve onto the spacer grid in the radial direction. It is known that Inconel will experience greater thermally induced expansion when compared to zircaloy. The preloading in the radial direction insures that any differential expansion will not result in the loosening of the mechanical joint between the sleeve and grid.

In both embodiments of the invention the dimensions of window 22 are selected so as to establish a very close fit between the upper and lower edges thereof and the top and bottom edges of the web members 12 subsequent to expansion of the sleeves. As a consequence of this close fit, any differential expansion in the lateral direction will result in the tight fit of the spacer grid web members in the sleeves being enhanced.

In the FIG. 5 embodiment, since sleeve 20' and guide tube 18 are comprised of the same material, the fabrication of a fuel assembly may additionally comprise the step of spot welding the expanded sleeves to the guide tubes as indicated at 28 in FIG. 5.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for the fabrication of a nuclear reactor fuel assembly, the fuel assembly including at least a first grid structure formed of web members fabricated from a first metal, the grid structure web members defining at least a first opening for receiving a guide tube formed of a second metal dissimilar to said first metal, the assembly technique comprising the steps of:
   selecting an open ended cylindrical sleeve, said sleeve being continuous at its oppositely disposed ends and having an outer diameter commensurate with the outer diameter of a guide tube to be passed through the guide tube opening in the grid;
   forming a plurality of circumferentially displaced windows in the sleeve, said windows having an axial length commensurate with the width of the spacer grid and a width determined by the grid geometry, said windows being located intermediate the length of the sleeve;
   inserting the sleeve into the guide tube opening in the spacer grid with the windows in registration with those regions where the spacer grid defining web members approach closest to the sleeve;
   swaging the sleeve radially outwardly along its entire length whereby the inner diameter of the sleeve along its entire length will be caused to be in excess of the outer diameter of the guide tube and the grid web members will be laterally captured by the upper and lower edges of the sleeve windows, the expansion of the sleeve also loading the sleeve against the grid in the radial direction with contact established between the side edges of the sleeve windows and the grid web members;
   inserting the guide tube through the sleeve; and
   affixing the sleeve to the guide tube by fusion bonding or swaging so as to prevent lateral movement between the tube and sleeve.

2. The method of claim 1 wherein the sleeve is comprised of the same material as the guide tube and wherein the step of affixing the sleeve to the guide tube comprises:
   fusion bonding the sleeve to the guide tube.

3. The method of claim 1 wherein the sleeve is fabricated from the same material as the spacer grid web members and wherein the step of affixing the sleeve to the guide tube comprises:
   swaging the guide tube to mechanically lock the guide tube to the sleeve above and below the spacer grid.

4. The method of claim 3 wherein the step of swaging the guide tube to the sleeve comprises:
   forming a plurality of circumferentially displaced apertures in those portions of the sleeve located above and below the terminations of the windows; and
   expanding the guide tube radially outwardly in areas aligned with the apertures in the sleeve.

5. The method of claim 4 further comprising the step of:
   fusion bonding the spacer grid web members to the sleeve.

* * * * *